United States Patent [19]

Paskert et al.

[11] 4,167,885
[45] Sep. 18, 1979

[54] SHEET METAL NAIL AND METHOD FOR PRODUCING SAME

[75] Inventors: Joseph H. Paskert, Lakewood; Clarence R. Vanniel, North Olmsted, both of Ohio

[73] Assignee: Eaton Corporation, Cleveland, Ohio

[21] Appl. No.: 825,330

[22] Filed: Aug. 17, 1977

[51] Int. Cl.² .......................... F16B 15/00; E01B 9/06
[52] U.S. Cl. ............................................ 85/11; 85/21; 85/28
[58] Field of Search ................................ 85/11, 21, 28

[56] References Cited

U.S. PATENT DOCUMENTS

| 1,604,437 | 10/1926 | White ............................... 85/11 UX |
| 2,404,245 | 7/1946 | Olsen ................................. 85/11 |
| 2,620,705 | 12/1952 | Podvinecz et al. ................. 85/13 |
| 2,745,308 | 5/1956 | Gisondi ............................. 85/11 X |
| 2,751,052 | 6/1956 | Flora ................................. 85/11 X |
| 3,983,779 | 10/1976 | Dimas ............................... 85/21 |
| 4,001,993 | 1/1977 | Daniels ............................. 85/11 X |

Primary Examiner—James C. Mitchell
Attorney, Agent, or Firm—R. J. McCloskey; H. D. Gordon

[57] ABSTRACT

An improved, one-piece, sheet metal nail having a generally cross-sectionally V-shaped shank portion and a head portion comprising extensions of the two legs defining the generally V-shaped shank portion which are folded inwardly at substantially right angles thereto is provided. One of said shank portion extensions will overlap the other of said shank portion extensions to provide a relatively easily produced head portion having improved strength characteristics. The extensions of the shank portion legs are of sufficient length to provide a head portion of sufficiently large area for driving of the nail and/or for providing a sufficiently large bearing surface to retain the member through which the nail is driven to the member into which the nail is driven.

6 Claims, 7 Drawing Figures

U.S. Patent  Sep. 18, 1979  4,167,885
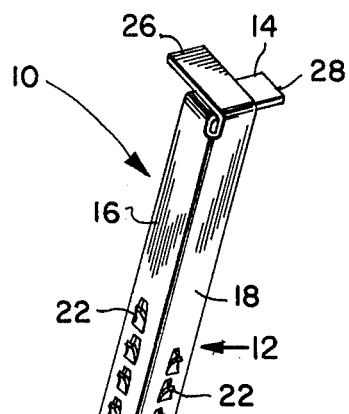
FIG. 1
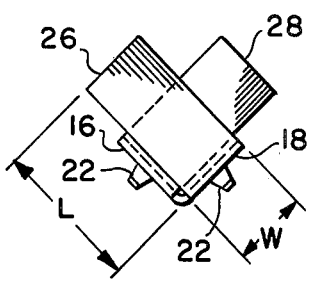
FIG. 2
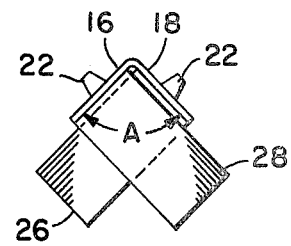
FIG. 3
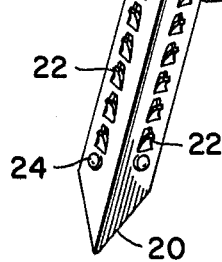
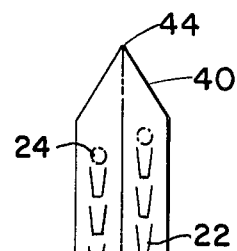
FIG. 4A
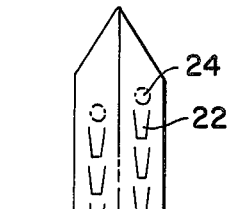
FIG. 4B  FIG. 4C
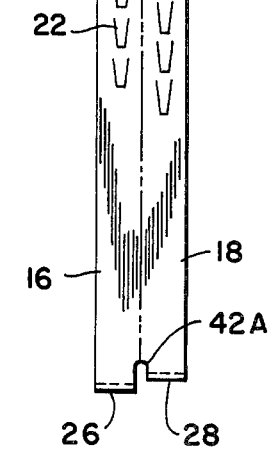
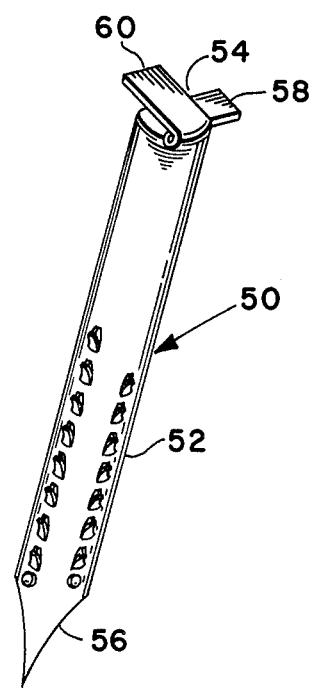
FIG. 5

SHEET METAL NAIL AND METHOD FOR PRODUCING SAME

PRIOR ART STATEMENT

The following references are considered to be relevant to the present invention:

UNITED STATES PATENTS

| | |
|---|---|
| 2,404,245 | Olson |
| 2,620,705 | Todvinecz et al |
| 2,751,052 | Flora |

U.S. Pat. No. 2,404,245 discloses a one-piece sheet metal nail having a generally "T" shaped head.

U.S. Pat. No. 2,620,705 illustrates a one-piece sheet metal nail in which the head portion is formed from two oppositely extending portions of the shank portions.

U.S. Pat. No. 2,751,052 illustrates a one-piece sheet metal nail having a head portion formed by an extension of the shank portion formed at a right angle thereto.

BACKGROUND OF THE INVENTION

1. Field of the Invention

This invention relates to the sheet metal nails and the method for producing same and more particularly relates to improvements in sheet metal roofing nails for use in roofing structures and the like in which the sheet metal nail is driven into a thickness of sheet steel or other sheet metal to secure a pad or layer of insulation or similar material thereto.

2. Description of the Prior Art

Sheet metal nails such as sheet metal roofing nails are well known in the prior art. Such nails are generally "T" or "L" shaped comprising a generally flat head portion and a shank portion extending generally perpendicularly from the head portion. The shank portion typically has a generally flat, V or arcuate cross-sectional shape and has a generally V-shaped or other pointed leading edge designed for piercing at the end thereof most distant the head portion. The shank portions are generally provided with at least one locking member, or tang, for lockingly engaging the underside of the media into which the nail is driven. Many nails utilize one or more axially extending columns of tangs having tangs spaced at various distances from the head portion to provide locking of the nail when utilized with various thicknesses of insulation material and/or roof decks and the like. Examples of the prior art devices may be seen by reference to U.S. Pat. Nos. 2,404,245; 2,620,705; and 2,751,052.

The sheet metal nails of the prior art have been less than totally satisfactory as the head portions thereof have been relatively complicated and/or expensive to manufacture and/or did not provide a desired strength and/or surface area for driving of the nail or retaining the material through which the nail was driven. The above drawbacks are particularly troublesome in connection with relatively long, heavy duty nails utilized for securing relatively thick layers of insulation or similar roofing materials to a sheet metal roofing deck or the like.

SUMMARY OF THE INVENTION

In accordance with the present invention, the drawbacks of the prior art have been overcome to the extent that an improved sheet metal nail having a relatively easily and inexpensively produced head portion displaying improved strength characteristics and providable with relatively large surface area is provided. The above is accomplished by providing a one-piece sheet metal nail having a generally cross-sectionally V-shaped shank portion and a head portion comprising extentions of the legs of the generally V-shaped shank portion which are folded inwardly at substantially right angles to the legs of the V-shaped shank portion from which they extend. One of the folded shank portion extensions overlaps the other of the folded shank portion extensions and the length of each shank portion extension is preferably at least twice as great as the width thereof to provide a relatively large striking surface and/or bearing area for the head portion of the nail.

Accordingly, it is an object of the present invention to provide a new and improved sheet metal nail.

A further object of the present invention is to provide a new and improved sheet metal nail having relatively easily produced head portion having superior strength characteristics.

Another object of the present invention is to provide a method for producing a new and improved sheet metal nail having an improved head portion.

These and other objects and advantages of the present invention will become apparent from a reading of the detailed description of the preferred embodiment taken in connection with the attached drawings.

BRIEF DESCRIPTION OF THE DRAWINGS

FIG. 1 is a perspective view of the improved sheet metal nail of the present invention.

FIG. 2 is a top view of the improved sheet metal nail of the present invention.

FIG. 3 is a bottom view of the improved sheet metal nail of the present invention.

FIGS. 4A through 4C are front elevational views of the method for producing the improved sheet metal nail of the present invention.

FIG. 5 is a perspective view of an alternate embodiment of the present invention.

DESCRIPTION OF THE PREFERRED EMBODIMENT

The one-piece sheet metal nail, or roofing nail, 10, of the present invention may be seen by reference to FIGS. 1, 2, and 3. The nail 10 comprises a generally vertically extending shank portion 12 and a generally horizontally extending head portion 14. The nail 10 is of a sheet metal, such as a spring steel, cold rolled steel, aluminum or the like, and is of a gauge sufficient to meet the requirements of the intended installation. It is understood that the terms "vertically", "vertically extending", "horizontal" and "horizontally extending" are used as descriptive terms referring to the drawings and are not intended to limit the scope of the present invention.

The shank portion 12 is of a generally cross-sectionally V-shape comprising legs 16 and 18 which define an included angle A therebetween of about 90°. The shank portion 12 may be of any desired length. The shank includes a free end, or leading end, opposite the head portion 14 which is provided with a generally V-shaped edge 20 for piercing the material into which the nail is to be driven. A plurality of tangs, or locking members, 22, are provided in the shank at different distances from the head portion. The tangs are arranged in two aligned rows, one on each of the legs of the shank portion, running generally parallel to the axis of the shank. The provision of tangs at various axial spacings from the head portion 14 allows the nail 10 to be utilized with insulation material and/or roof deck material of various thicknesses as is well known in the prior art.

An aperture 24 may be provided adjacent the leading edge 20 of the shank 12 for use in hanging wire bundles, false ceilings and the like.

The head portion 14 comprises extensions 26 and 28 of the legs, 16 and 18 respectively, of the generally V-shaped shank portion 12. The extensions 26 and 28 are folded inwardly at substantially right angles with respect to the leg of the V-shaped shank from which they extend. It is noted that folded extension 26 overlaps folded extension 28. Both of the folded extensions 26 and 28 are of a length l which is preferably greater than the width w thereof. Preferably, the length l is at least twice as long as the width w. It may be seen that the improved head portion 14 defines a large striking area for driving of the nail and a large surface area for retaining the insulation material or the like to the roofing deck or the like.

The method for producing the improved sheet metal nail 10 of the present invention may be seen by reference to FIGS. 4A through 4C. In FIG. 4A a blank B is provided having a generally V-shaped lower edge 40 and a slot 42 extending axially towards the V-shaped edge 40 and aligned with the point 44 thereof. The slot 42 extends for only a portion of the axial length of the blank B. At this stage of the operation, the tangs 22 may also be formed in the work piece.

In FIG. 4B the extensions 26 and 28 of legs 16 and 18 respectively are folded, in the direction, at substantially right angles to the respective legs from which they extend. One of the legs, 28, is folded along a line L generally perpendicular to the slot 42 and intersecting the closed end 42A thereof. The other leg, 26 is folded along a line LL generally parallel to line L but axially displaced therefrom towards the closed end 42B of slot 42 by substantially the thickness of blank B.

In FIG. 4C, legs 16 and 18 are folded along a line generally coaxial with the slot 42 to form the generally cross-sectionally V-shaped shank 12 and the head 14 of the improved nail 10.

An alternate embodiment of the present invention may be seen by reference to FIG. 5. In FIG. 5, a one-piece sheet metal nail 50 having a generally vertical shank portion 52 and a generally horizontal head portion 54 is illustrated. Shank portion 52 is of a generally cross-sectionally arcuate shape and includes a generally V-shaped leading edge 56. The head portion 54 comprises extensions 58 and 60 of shank portion 52 which are folded inwardly at substantially right angle to the shank.

Although this invention has been described in its preferred form with a certain degree of particularity, it is understood that the preferred embodiment has been described by way of example only and that various modifications may be resorted to without departing from the spirit and the scope of the invention as hereinafter claimed.

I claim:

1. An improved one-piece sheet metal nail of the type comprising a generally cross-sectionally V-shaped shank portion and a head portion, said V-shaped shank portion comprising a first and second leg defining an included angle therebetween, said shank portion having a generally pointed penetrating end at the end thereof opposite the head portion, the improvement comprising:

said head portion comprising extensions of the legs of said generally V-shaped shank portion, said extensions folded inwardly at substantially right angles to the leg from which they extend, one of said extensions overlapping the other extension.

2. The improved sheet metal nail of claim 1 wherein said shank portions include a plurality of outwardly extending tangs thereon.

3. The improved sheet metal nail of claim 1 wherein said penetrating end is of a generally V-shape.

4. The improved sheet metal nail of claim 3 wherein each of said extensions has a length, measured perpendicularly from the leg from which it extends, which is greater than the width thereof.

5. The improved sheet metal nail of claim 4 wherein said length is at least twice as large as said width.

6. A one-piece sheet metal nail comprising a shank portion and a head portion extending substantially perpendicularly from one end of said shank portion, the other end of said shank portion being provided with a generally "V" shaped leading edge, said shank portion being of a generally arcuate cross-sectional shape, said head portion comprising two extensions of said shank portion extending from said one end of said shank portion at opposite ends of said arcuate cross section, said extensions being folded inwardly at substantially right angles to said shank portion.

* * * * *